(12) United States Patent
Capan (10) Patent No.: US 8,418,687 B2
(45) Date of Patent: Apr. 16, 2013

(54) PARABOLIC SOLAR TROUGH SYSTEMS WITH ROTARY TRACKING MEANS

(75) Inventor: Rahmi Oguz Capan, Marmaris (TR)

(73) Assignee: Hse Hitit Solar Enerji Anonim Sirketi, Istanbul (TR)

( * ) Notice: Subject to any disclaimer, the term of this patent is extended or adjusted under 35 U.S.C. 154(b) by 1079 days.

(21) Appl. No.: 12/294,131

(22) PCT Filed: Mar. 28, 2006

(86) PCT No.: PCT/IB2006/050941
§ 371 (c)(1),
(2), (4) Date: Mar. 3, 2009

(87) PCT Pub. No.: WO2007/110713
PCT Pub. Date: Oct. 4, 2007

(65) Prior Publication Data
US 2009/0183731 A1    Jul. 23, 2009

(51) Int. Cl.
*F24J 2/38* (2006.01)
(52) U.S. Cl.
USPC ........... 126/600; 126/605; 126/684; 126/685; 126/692; 126/694; 126/696
(58) Field of Classification Search .................. 126/600, 126/684, 685, 692, 694, 696, 605
See application file for complete search history.

(56) References Cited

U.S. PATENT DOCUMENTS

| 1,240,890 A | * | 9/1917 | Shuman | 126/581 |
|---|---|---|---|---|
| 3,154,141 A | * | 10/1964 | Huet | 165/133 |
| 4,065,053 A | * | 12/1977 | Fletcher et al. | 237/1 R |
| 4,071,017 A | | 1/1978 | Russell et al. | |
| 4,077,392 A | * | 3/1978 | Garner | 126/600 |
| 4,136,671 A | | 1/1979 | Whiteford | |
| 4,149,523 A | * | 4/1979 | Boy-Marcotte et al. | 126/589 |
| 4,153,039 A | * | 5/1979 | Carroll | 126/605 |
| 4,243,019 A | * | 1/1981 | Severson | 126/634 |
| 4,304,221 A | * | 12/1981 | Trihey | 126/581 |
| 4,328,792 A | | 5/1982 | Shores | |
| 4,432,343 A | | 2/1984 | Riise et al. | |
| 4,452,398 A | * | 6/1984 | Wheaton et al. | 239/741 |

(Continued)

OTHER PUBLICATIONS

International Preliminary Report on Patentability dated Mar. 5, 2008, International Application No. PCT/IB2006/050941, 6 pgs.

*Primary Examiner* — Kenneth Rinehart
*Assistant Examiner* — Jorge Pereiro
(74) *Attorney, Agent, or Firm* — Brinks Hofer Gilson & Lione (57) ABSTRACT

The inventive solar trough field system (A) comprises multiple parabolic reflectors (1), support circles (3) of which the center coincides with the focus of the parabolic reflector (1) and which are used in order to support the reflector (1), core mechanisms (2) which are located on the center of the circles (3), guy wires (4) which connect the circle (3) and the core mechanism (2) to each other, side support units (5,5J) which bear the support circles (3) from their outer surfaces, lightweight filling materials (6) which support the reflectors (1) from their lower parts, thermal receiver tubes (11) which pass through the center axis of the circles (3). The parabolic reflectors (1) are rotated around the center axis of the circles (3), which is the focus thereof, and directed towards the sun. Thus, the parallel beams coming from the sun are concentrated in the thermal receiver tubes (11) which are located in the focus of the reflectors (1).

18 Claims, 8 Drawing Sheets

U.S. PATENT DOCUMENTS

| | | |
|---|---|---|
| 4,559,926 A | 12/1985 | Butler |
| 4,820,033 A * | 4/1989 | Sick .............................. 359/852 |
| 6,664,939 B1 * | 12/2003 | Olinyk et al. ................. 343/912 |
| 2004/0055594 A1 * | 3/2004 | Hochberg et al. ............. 126/696 |
| 2006/0150967 A1 * | 7/2006 | Hoelle et al. .................. 126/694 |
| 2008/0087277 A1 * | 4/2008 | Schweyher ................... 126/694 |

\* cited by examiner

PARABOLIC SOLAR TROUGH SYSTEMS WITH ROTARY TRACKING MEANS

TECHNICAL FIELD

This invention relates to the developments on parabolic trough-shaped collectors which concentrate the sunlight on a focus and convert it into another energy forms such as heat and electricity.

PRIOR ART

Currently, trough collectors (solar trough field system) are used to collect the sun's energy in order to obtain electricity and heat therefrom. These systems comprise trough-shaped long parabolic reflectors, thermal receiver tubes which are placed on the focus of the reflectors where beams coming from the reflector are collected and in which a fluid exists, and a rotating mechanism which directs the reflectors to the location where the sun is. The beams coming to the reflectors which are directed towards the sun are reflected and collected on the thermal receiver tube which is located on the focus of the reflector. Thermal receiver tube is provided with two nested tubes where a vacuum setting is located in the space therebetween. A fluid, which provides the heat transfer, is passed through the inner tube. The outer tube is made of glass. By concentrating the beams coming from the reflectors on the thermal receiver tube, this tube reaches very high temperatures; therefore, the fluid located in the inner tube can be heated. Heat energy can be converted into the electric energy, when desired, by means of this fluid which reaches high temperatures. However, since thermal receiver tubes used in these systems are many meters long, said thermal receiver tubes follow the sun together with the reflectors, outer parts thereof are made of glass, such factors increase their possibility of breaking during operation. In addition, dynamic and static forces which are generated by the wind can cause both reflectors and tubes to break. In order to decrease the breaking of the parabolic reflectors, a truss structure is formed to support the reflectors on their convex sides. However, this structure decreases only the rate of breaking and is not a complete solution for breaking. The vibrations generated as a result of the movement which is made by the system for directing towards the sun can also cause the glass tubes to break. The solar trough field systems which are built on California (USA) by LUZ can be given as an example for these systems. In that system of LUZ, the parabolic reflectors which are many meters long and the thermal receiver tubes which are located on their focus are rotated together. The most fundamental problem of this system is that the thermal receiver tubes which are made of a fragile material are movable. As long as the thermal receiver tubes are movable, they are subjected to more torque load and the flexible hoses are used in the connections of the beginning and ending points of the parabolic reflectors with the fixed tubes. The thermal receiver tubes which are subjected to the torque loads have a higher possibility of breaking. On the other hand, it is understood that the flexible hose connection is not a safe system since the temperature of the fluid which is transferred within the thermal receiver tube is 300-500° C. In addition, it has been obtained from the field observations that the truss structure, which supports the parabolic mirrors, is also weak against the torque and the moment loads acting due to the drive unit of the system and the wind. Because of these loads, the parabolic reflectors are frequently broken, thus causing the operating costs to increase.

Due to the problems encountered in the above-mentioned system of LUZ, a so-called EUROTROUGH project which is supported by the European Union is initiated. In the scope of this project, the lower part of the parabolic reflectors is supported by a truss structure which can resist more against the torque and the moment loads, and there are inflexible movable tubes attached to the rotary joint on the connection points of the movable thermal receiver tubes with the fixed tubes. Although the truss system which is developed with EUROTROUGH is safer than the system of LUZ, it could not strictly eliminate the breaking problem of the parabolic reflectors and the thermal receiver tubes. It has been understood from the field observations that the possibility of breaking the thermal receiver tubes decreases only to some extent since they are movable in this system as well. In addition, it has been also revealed from the field observations that the hot fluid frequently leaks out from these connections of the thermal receiver tubes comprising rotary joint connection points.

Another problem observed with LUZ and EUROTROUGH is that the hydraulic pistons of both systems cannot move with the required sensitivity to follow the sun. It is highly difficult and generates an adjustment problem to make a sensitive speed control with the hydraulic piston units and provide simultaneous operations of multiple piston units which are used for multiple parabolic reflectors. Additionally, in both systems, while following the sun, continuous displacement of the center of gravity causes more energy consumption to run these systems.

In a system disclosed in the published patent document U.S. Pat. No. 4,559,926, trough-shaped parabolic reflectors reflect the sunlight to the receiver tube, thus allowing the fluid located in the tube to heat. In this system, the receiver tube is kept constant and located on the focus of the parabolic reflectors. Circular-shaped support parts are located on the both ends of the parabolic reflectors, and the center of said support parts are such that they coincide with the focus of the reflectors. Circular support parts are rotated around the center axes in order system to follow the sun, thus allowing the parabolic reflectors to rotate around the immovable receiver tube located on the focus thereof. In this system, by keeping the receiver tubes immovable, the breaking problems arising from the deformation are reduced. However, in this system, providing the movement of all parabolic reflectors with a single motor unit causes the entire system to stop in case of a failure of this motor unit. In addition, efforts are put forth to rotate all parabolic reflectors synchronously with one motor; but in this case, it is not possible to rotate them with the same sensitivity with respect to one another. The main reason for this is that all reflectors are tried to move through the mechanism parts such as belt, chain, gear which are connected to a single motor in the system. Due to the use of said mechanism parts in this way, there will be a rotation difference between the closest reflector and the farthest reflector to the motor. This difference arises from the operation spaces between the mechanism parts which are added one after the other. On the other hand, it is very difficult and expensive process to produce the parabolic reflectors integrally, and a breaking which can occur in the reflectors causes all reflectors to be changed. Placement of the circular support parts which are used in this system onto the wheels which stand close to each other reciprocally also produces a balance problem in the system and causes the reflectors to be more affected by the wind loads.

In a system disclosed in the published patent document U.S. Pat. No. 4,432,343, a parabolic structured reflector is supported by a cylindrical profile passing underneath thereof and a circular structure located on the edges thereof. In the middle, there is a thermal receiver tube placed so as to pass from the center of the semicircle which is located on edges thereof. The reflector is placed onto the support wheels which stand opposite to each other and rotated by means of the main motor. Standing wheels too close to each other and locating them on the lowest portion of the reflectors cause the reflectors to be more affected by the wind loads. In addition, all reflective panels are rotated by a single motor similar to U.S. Pat. No. 4,559,926.

With this invention, developments on the solar collectors with parabolic reflector, which rotate around a fixed thermal receiver tube, are disclosed. With the invention, the convex parts of the parabolic reflectors are filled with a lightweight material, thus increasing the strength of the reflectors. In addition to this, support circles were installed at certain intervals throughout the parabolic reflectors. In order to reduce the weight of said support circles and increase their strength to greater extent, guy ropes are used between the circle and its center. In addition, a great number of motor units are used in order to direct all parabolic reflectors, which are many meters long, with the same sensitivity towards the sun. A more sensitive sun follow-up is provided by lesser capacity motors running synchronously with each other instead of a single motor unit which has sufficient capacity to rotate all collectors, and also even if some of the motors fail there is no need to stop entire collector system. In addition to these, in order to decrease the maintenance and replacement expenses which will occur in case of breaking the parabolic reflectors and more importantly decrease the manufacturing cost significantly, it is considered to use multi-piece parabolic reflectors instead of single-piece parabolic reflectors. Owing to multi-piece parabolic structure, even if some reflector parts are broken, the system can continue to run without suffering too much efficiency loss. Manufacturing cost of the single-piece parabolic reflectors in the systems of the prior art accounts for 20% of the entire system cost, which is an important part thereof. A parabolic reflectors system comprising flat surface multi-piece reflectors proposed with the invention reduces this cost significantly.

In addition to these, with some changes made on the thermal receiver tube in the collector system, the efficiency is ensured to increase. Developments made in this point are related to the use of heat transfer fins within the thermal receiver tubes.

On the other hand, an advantage obtained from keeping the thermal receiver tubes constant is the direct steam generation. Difficulties are encountered during the direct steam generation in the thermal receiver tubes with flexible hose connection or rotary joint connection which are used in the prior art, and the generated steam leaks out to external environment from said connection points.

AIM OF THE INVENTION

An aim of the invention is to provide solar collectors with parabolic reflector, which rotate around a fixed thermal receiver tube, to direct more sensitively towards the sun by using synchronously running motors with each other, and to have the motors run, even if some of them fail, without any need to stop entire collector system.

Other aim of the invention is to support the convex parts of the parabolic reflectors with lightweight and resistant filling materials and decrease the bending and the torsion effects generated by the wind. It is also aimed, owing to a more lightweight collector system, to decrease the load imposed on the motor and thus save the electric energy which is necessary to rotate the system.

Another aim of the invention is to use guy wires between the circle and its center in order to reduce the weight of the support circles used at certain intervals throughout the parabolic reflectors, and also to reduce the weight of the present circle more and use them at more frequent intervals, thus increasing the resistance against the wind loads.

Yet another aim of the invention is to decrease the maintenance and replacement expenses which will arise in case of breaking the parabolic reflectors and to ensure the use of multi-piece parabolic mirrors instead of single-piece ones in order to prevent the system from suffering too much efficiency loss even if some reflector parts are broken.

Another aim of the invention is to use heat fins in the thermal receiver tubes, thus providing an efficiency increase.

DESCRIPTION OF FIGURES

Inventive solar energy system is shown in the attached drawings, wherein.

The parts in the figures are numbered one by one and the corresponding terms of these numbers are given below.
Solar trough field system (A)
Parabolic reflector (1)
Core mechanism (2)
Support circle (3)
Guy wires (4)
Side support units (5, 5')
Lightweight filling material (6)
Wheels (7, 7')
Protective lid (8)
Support profiles (9)
Lower lid (10)
Thermal receiver tube (11, 11', 11')
Inner circle (12)
Rotary joint (13)
Housing (14)
Glass tube (15, 15a)
Vacuum compartment (16)
Transfer tube (17)
Hyperbolic reflector (18)
Heat fins (19)

DESCRIPTION OF INVENTION

Figure 1:
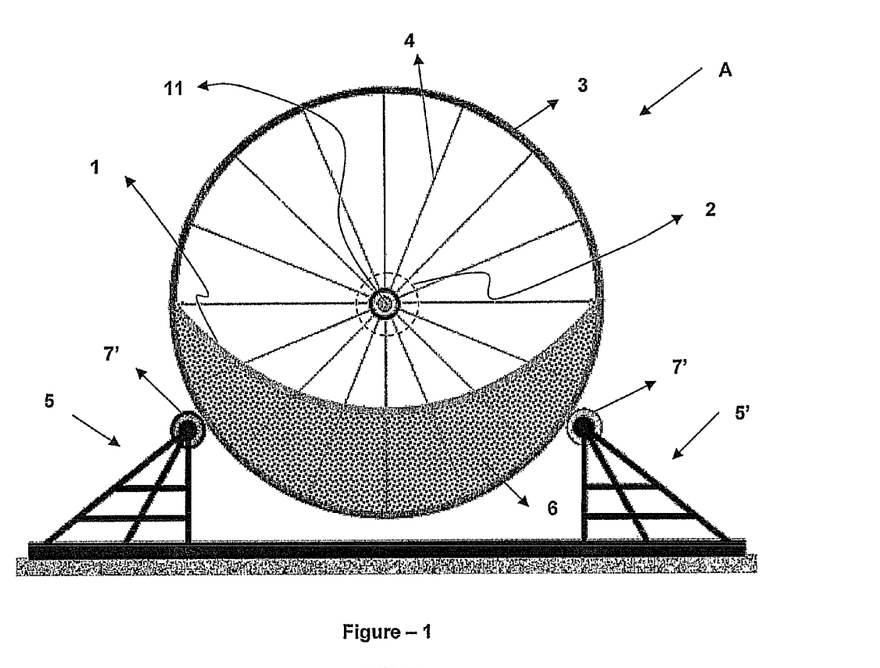
FIG. 1 is a side view of the parabolic collector system which is called the solar trough.
Figure 2:
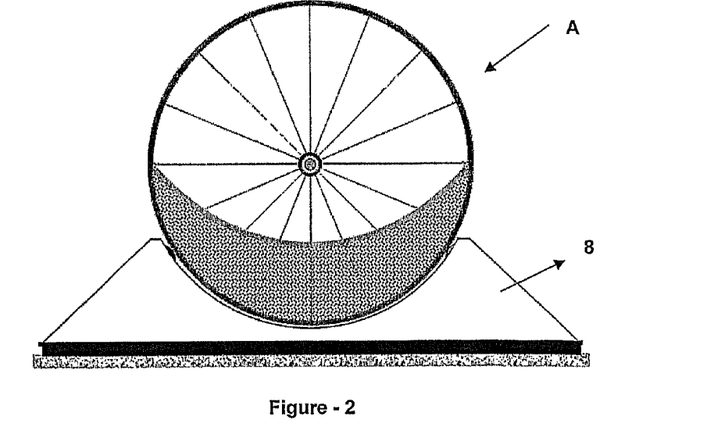
FIG. 2 is a side view of the solar trough field system.

FIG. 1 provides a side view of the inventive solar trough field system (A). A solar trough field system (A) comprises multiple parabolic reflectors (1), support circles (3) of which the center coincides with the focus of the parabolic reflector (1) and which are used in order to support the reflector (1); core mechanisms (2) which are located on the center of the circles (3); guy wires (4) which connect the circle (3) and the core mechanism (2) to each other; side support units (5, 5') which bear the support circles (3) from their outer surfaces; lightweight filling materials (6) which support the reflectors (1) from their lower parts; thermal receiver tubes (11) which pass through the center axis of the circles (3). The solar trough field system (A) is rotated around the center axis of the circles (3) and in this way; the parabolic reflectors (1) are also directed towards the sun by rotating in this rotation axis which is their focus. Thus, the parallel beams coming from the sun are concentrated in the focus of the reflectors (1), i.e. thermal receiver tubes (11). The beams, which are concentrated on the rotation axis or in other words, thermal receiver tubes (11) which are concentric with the focus of the reflector (1), heat the fluid in the thermal receiver tube (11), and allow the heat energy to be obtained. In order to provide the movement of the inventive solar trough field system (A), multiple motors running synchronously with each other, reducer units using the movement, which it takes from this motor, for torque increment, and movement mechanisms turning the parabolic reflectors (1) with these reducer units are used. These said motor, reducer and movement mechanisms, which are not shown in the figures, ensure that the circles (3) rotate around their centers while contacting the side support units (5, 5') and thus the reflectors (1) integrated with the circles (3) are directed towards the sun. These said motor, reducer and movement mechanisms are positioned near the support circles (3). There can be freely rotatable wheels (7, 7') on the side support units (5, 5') where they contact with the circles (3), these wheel (7, 7') groups can also be used as the parts of the mechanisms which move the circles (3). The protective lid (8), which is shown in FIG. 2, is used to protect the side support units (5, 5') and the wheels (7, 7') from the external effects.

Figure 3:
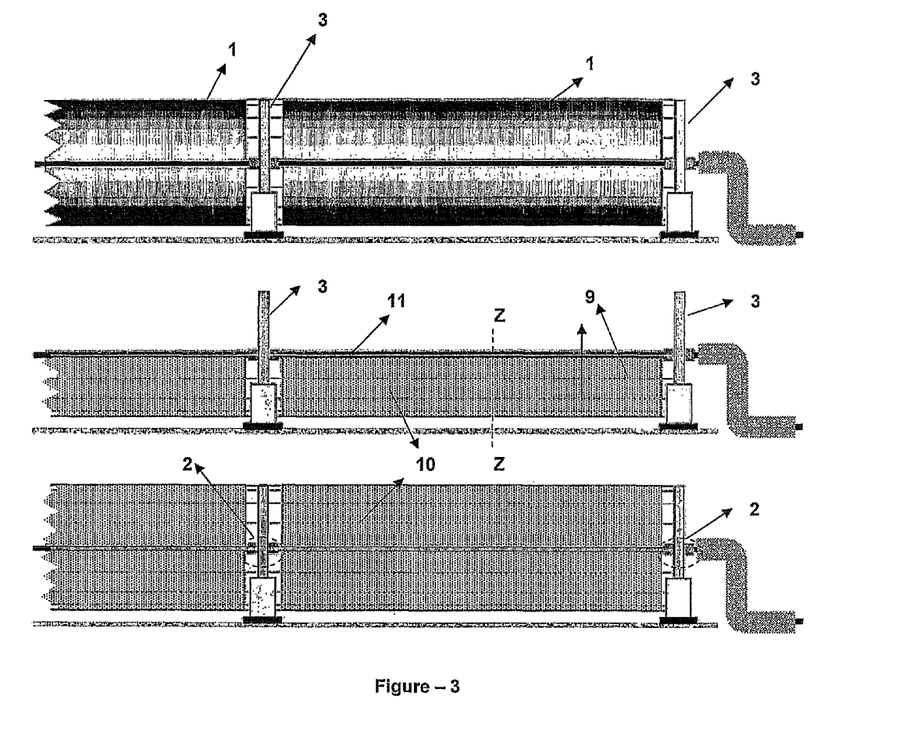
FIG. 3 is the front views of the solar trough field system.
Figure 4:
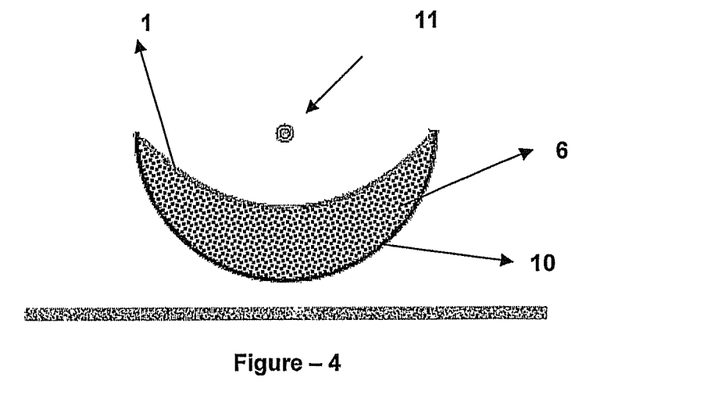
FIG. 4 is a section view of the solar trough field system.
Figure 5:
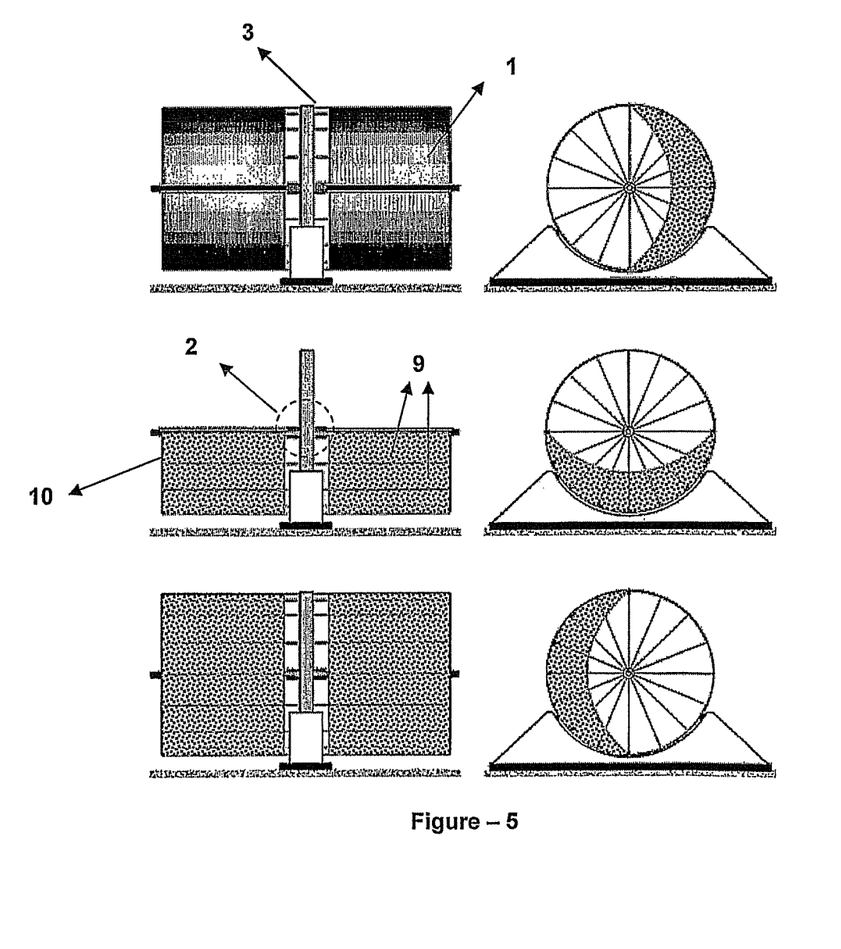
FIG. 5 is the side and front views of a part of the solar trough field system during the operation.

FIG. 3 provides the front views of the solar trough field system (A) in a position where it is rotated to different directions. Since the solar trough field systems consist of the parabolic reflectors which are many meters long, they must be both robust against the wind loads and have a lesser energy consuming structure in order to work more efficiently. It is important them to be lightweight in order to spend lesser energy. The inventive solar trough field system (A), which is designed by starting from this point, has the support circles (3) between the subsequent parabolic reflectors (1) as shown in FIG. 3. FIG. 4 provides the view of the Z-Z section from FIG. 3 wherein the lower lids (10) for supporting the reflectors (1) which are located in the lower parts of the parabolic reflectors (1), and the lightweight filling material (6) which fills the space between the lower lids and the reflectors (1) are shown. The lower lids are shown in the circular cross section as an example in FIGS. 3 and 4. In addition, support profiles (9) are used for the connection of every support circle (3) to each other and to the integrated structure composed of the reflector (1), the lower lid (10) and the lightweight filling material (6). FIG. 5 provides the side and front views of a part of the solar trough field system during the operation.

Figure 6:
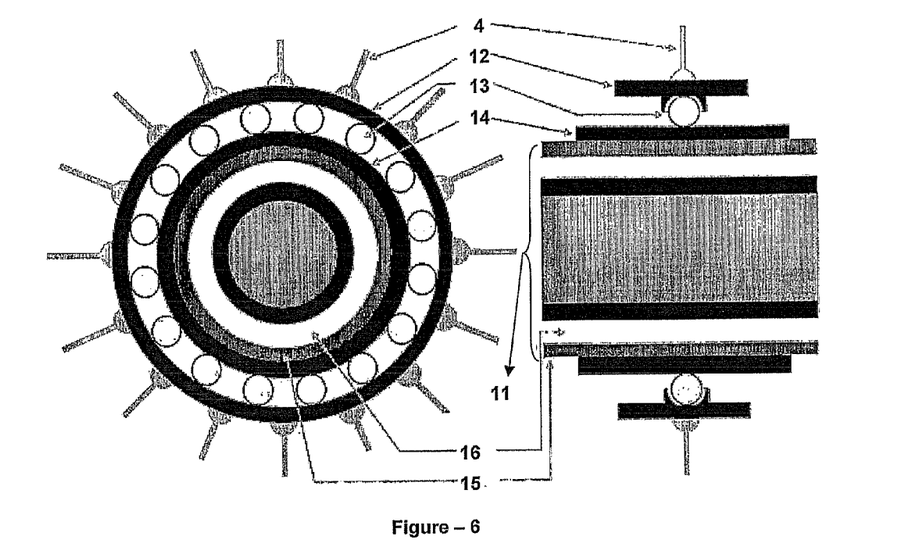
FIG. 6 is the side and front detailed views of the core mechanism of the solar trough field system.

FIG. 6 provides the side and front detailed views of the core mechanism (2) of the solar trough field system (A). The core mechanism (2) comprises an inner circle (12) to which guy ropes are connected, a ball or cylindrical roller bearing (13) which is located in the center of the inner circle (12), a seat (14) into which the inner ring of the bearing (13) is placed and a thermal receiver tube (11) which passes through this seat. The thermal receiver tube (11) consists of two tubes which are nested, concentric with each other and have a vacuum compartment (16) therebetween. A fluid is passed through the inner tube, called as transfer tube (17), with high heat conductivity for the heat transfer. Outer glass tube (15) allows the beams coming from the parabolic reflectors to reach directly to the transfer tube (17). The temperature of the transfer tube (17) and the fluid therein increases in this way. In order to avoid heat loss through convection from transfer tube (17) to outside, a vacuum space (16) is created between the glass tube (15) and the transfer tube. As is known, the thermal receiver tubes (11) are used in many meters long in the solar trough field systems. In order to decrease the possibility of breaking the glass tubes (15) which are located in these tubes (11), the thermal receiver tubes (11) are kept completely immovable in the inventive solar trough field system (A). The thermal receiver tube (11) concentrically with the housing (14) is placed into this housing (14) which is in an immovable position and the tube (11) is secured. In order to rotate the support circles (3) and the reflectors (1) shown in FIG. 1-5 around the center of the thermal receiver tubes (11) without damaging these tubes (11), the support circles (3) are connected to the inner circle (12) through guy wires (4) and can rotate around the fixed housing (14) through the bearing (13) in the center of the inner circle (12).

Figure 7:
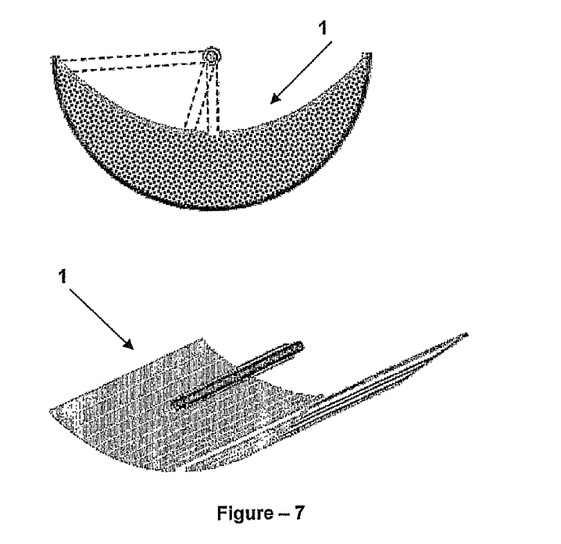
FIG. 7 is the side and perspective views of the parabolic reflectors in the solar trough field system.

FIG. 7 provides the side and perspective views of the parabolic reflectors (1) in the inventive solar trough field system (A). The improvement made on the parabolic reflectors (1) with the invention is that the reflectors (1) are produced as longitudinal multi-piece instead of single-piece. Thanks to this multi-piece structure, even if some reflector parts are broken, it is easy to change them. In addition, the breaking of single-piece reflectors due to the external effects can damage the substantial part of the reflectors. Owing to multi-piece structure, only the reflectors which remain under the effect are broken, and the possibility of damage to entire parabola decreases. In addition, maintenance and replacement expenses, which may arise when the parabolic reflectors are broken, decrease and even if some reflector parts are broken, the system can continue to run without suffering too much efficiency loss. In the multi-piece parabolic reflectors (1), the edge width of those which are close to the center of the parabola is narrow and the width of these reflector parts increases towards the sides of the parabola. The surfaces of the multi-piece parabolic reflectors which face towards the thermal receiver tubes can be produced in two different ways. The first alternative is to make these surfaces planar. The reflectors which are placed on the concave surfaces of this parabolic solar trough are placed on this trough such that they reflect the light coming onto their plane surfaces to the thermal receiver tube. The second alternative is that said surfaces of these multi-piece reflectors are each in the form of a parabolic cross section. When said parabolic cross sectioned reflectors are positioned one after the other on the concave surface of a parabolic solar trough again, a multi-piece parabolic reflector system, where the focal point of each is the thermal receiver tube, is produced.

Figure 8:
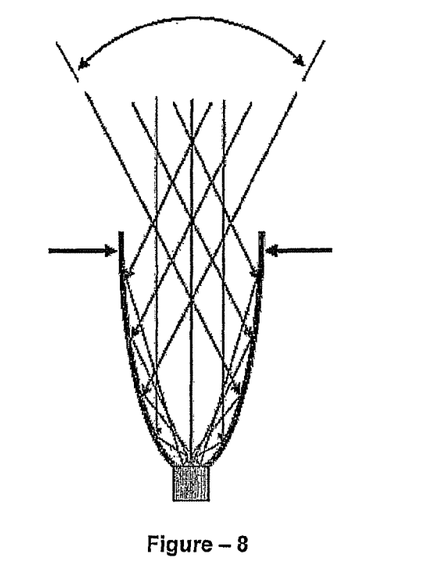
FIG. 8 is a side view of an exemplary hyperbolic collector.
Figure 9A:
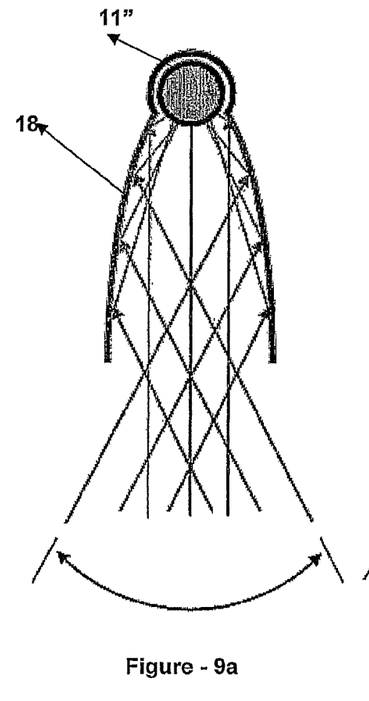
FIG. 9a is a side view of a hyperbolic collector adapted to the thermal receiver tube.
Figure 9B:
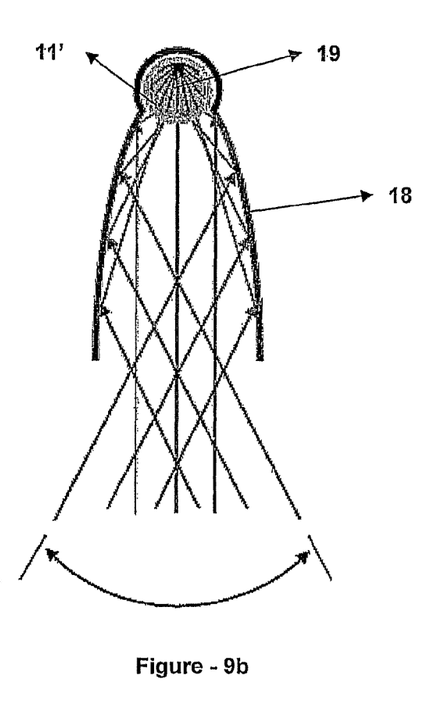
FIG. 9b is a side view of a hyperbolic collector adapted to the thermal receiver tube in which heat transfer fins are used.
Figure 10:
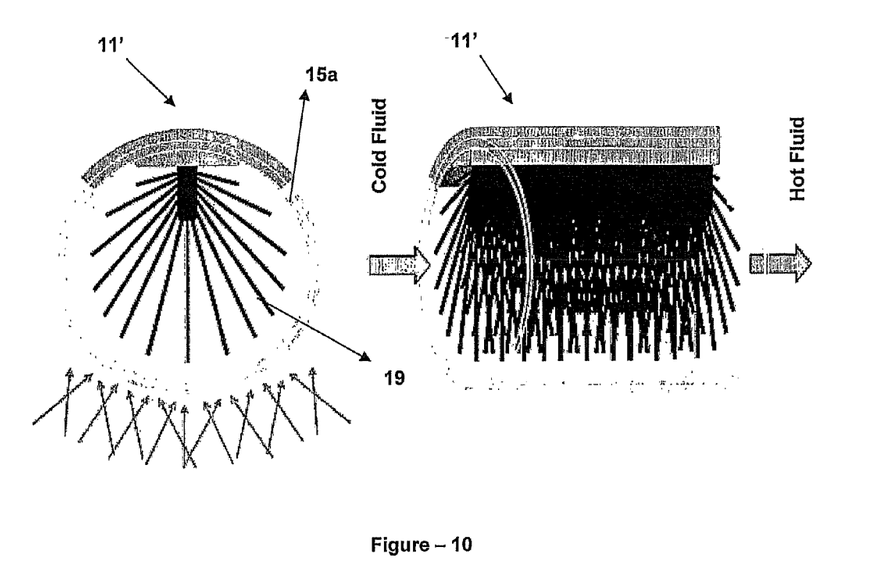
FIG. 10 is the side and perspective views of the heat fins structure which is located inside the thermal receiver tube.

FIG. 8 provides a side view of an exemplary hyperbolic collector. In this demonstration, it is shown that the beams which come to reflector as parallel and at certain angles concentrate on the bottom side of the hyperbola. An improvement made with the invention is the use of a hyperbolic collector around the thermal receiver tube. FIG. 9 provides a side view of a hyperbolic collector adapted to the thermal receiver tube. The use of a hyperbolic collector was considered in order to concentrate the beams coming angularly as well as the parallel beams coming from the parabolic reflectors in the thermal receiver tube. FIG. 9a shows a hyperbolic collector (18) placed around the thermal receiver tube (11"). The bottom side of this hyperbolic collector (18) was produced as circular cross sectioned such that it somewhat surrounds the thermal receiver tube (11") and then hyperbolic form was given to its arms extending towards two sides. In this way, the beams coming parallel and angularly from the parabolic reflector reflect from the inner surface of the hyperbolic collector (18) and concentrate on the thermal receiver tube (11"), and the concentration of the light coming on the tube (11") is increased, thus ensuring the more efficient operation of the solar trough field system (A). The thermal receiver tube (11") which is used herein is made of a tube with high heat conductivity. Since there is a hyperbolic collector (18) around said thermal receiver tube (11"), there is no need to use a glass tube in its outer side. An improvement made in order to allow the efficiency increase is also shown in FIG. 9b. In this demonstration, the use of a different thermal receiver tube (11') which is also used together with the hyperbolic collector (18) is presented. Unlike the previous thermal receiver tube (11"), this tube (11') is made of glass and the heat fins (19) with high heat conductivity are used therein in order to heat the fluid passing through this tube (11') more quickly. Said heat fins (19) may be the fins which are in the form of a plate from the profile; however they may be used in the form of a bar as shown in FIG. 10 as well. Plate-shaped fins provide manufacturing and mounting easiness compared to bar-shaped fins. Since the bar-shaped ones cast a less shadow on one another, they are more efficient than the plate-shaped ones. It is possible to use both fin structures in this system (A). On the other hand, it is also possible to use a second glass tube on the outer parts of the thermal receiver tubes (11", 11') which are shown in FIGS. 9a and 9b such that a vacuum space will be therebetween. FIG. 10 provides the side and perspective views of the heat fins (19) structure which is located inside the thermal receiver tube (11'). The heat fins (19) are located longitudinally inside the glass tube (15a) and integrally with this tube (15a).

Since the thermal receiver tube (11"), which is an exemplary embodiment of the invention, is somewhat surrounded by the hyperbolic collector (18), it is less affected by the external environment conditions. Therefore, since a second glass tube is not preferred in the thermal receiver tube (11"), there is no need to perform the operations such as combining the glass tubes which are many meters long, creating a vacuum space, providing tightness; and there arises an opportunity to save money on the issues such as material, workmanship, maintenance, repair owing to the absence of these glass tubes which are the most fragile components of the system even if they are in a fixed position.

Figure 11:
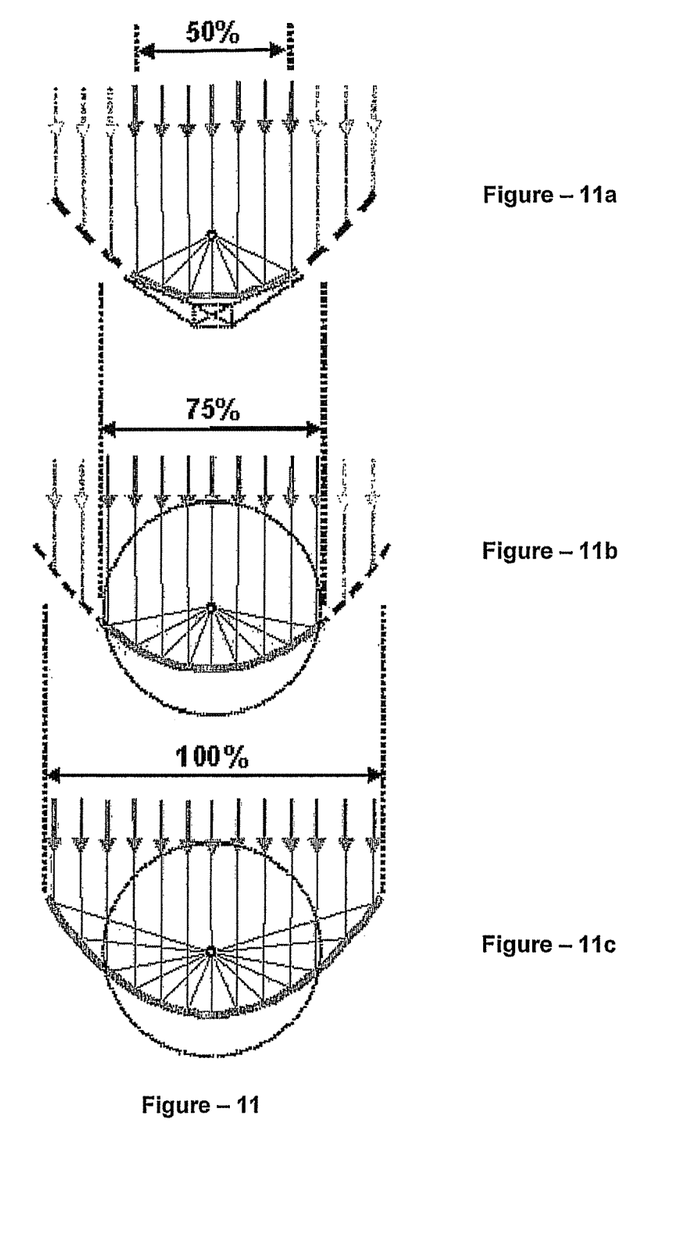
FIG. 11a is a schematic view of the light collection field in the solar troughs which are used in the prior art.
FIG. 11b is a schematic view of the light collection field in the inventive solar trough.
FIG. 11c is a schematic view of the light collection field in the inventive solar trough.
Figure 12:
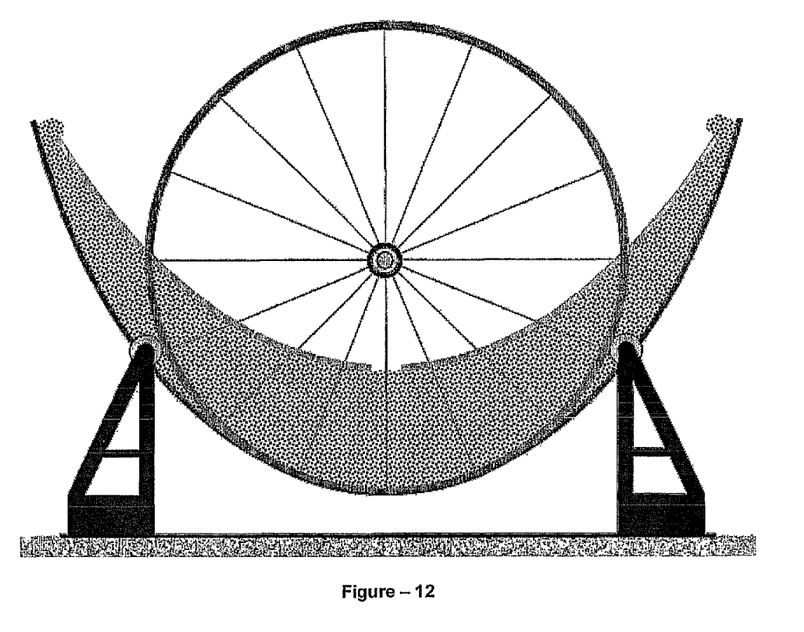
FIG. 12 is a side view of an inventive exemplary solar trough.

FIG. 11a provides a schematic view of the light collection field in the solar troughs used in the prior art. FIG. 11b provides a schematic view of the light collection field in the inventive solar trough. As is seen, the light collection field in the inventive solar trough can be enlarged approximately 1.5 times compared to the prior art. With a new example such as the one in the FIG. 11c, the light collection field in the inventive solar trough can be enlarged 2 times or more. For this, the arms of the parabolic form should be made such that they extend towards the outside of the support circle. An example which demonstrates this embodiment is shown in FIG. 12. While the temperature of the fluid which passes through the thermal receiver tubes can reach approximately 400° C. in the prior art, the temperature of the fluid which passes through the thermal receiver tube can increase to 600° C., even 750° C. by means of the elongated parabola arms in the inventive systems with increased light collection field.

The developments in the above preferred solar trough field systems (A) are not intended to limit the protection scope of the invention. According to the information described with the invention, modifications to be performed on the developments in this preferred solar trough field systems (A) should be evaluated within the protection scope of the invention.

The invention claimed is:

1. A solar trough field system (A), which is used to concentrate the sunlight on a focus and convert it into another energy forms such as heat and electricity, comprising multiple parabolic reflectors (1); support circles (3) of which the center coincides with the focus of the parabolic reflector (1) and which are used in order to support the reflector (1) and located between the parabolic reflectors (1) following one another; core mechanisms (2) which are located on the center of the circles (3); guy wires (4) which connect the circle (3) and the core mechanism (2) to each other; side support units (5, 5') which bear the support circles (3) from their outer surfaces; lightweight filling materials (6) which support the reflectors (1) from their lower parts; thermal receiver tubes (11) which pass through the center axis of the circles (3); and where said system is rotated around the center axis of the circles (3) and in this way; the parabolic reflectors (1) are also directed towards the sun by rotating in this rotation axis which is their focus, thus the beams coming parallel from the sun are concentrated on the thermal receiver tubes (11) which are located on the focus of the reflectors (1), characterized in that in order to ensure that the circles (3) rotate around their centers while contacting the side support units (5, 5') and thus the reflectors (1) integrated with the circles (3) are directed towards the sun, multiple motors running synchronously with each other, reducer units using the movement, which it takes from this motor, for torque increment, and movement mechanisms turning the parabolic reflectors (1) with these reducer units are used and these said movement mechanisms are positioned near the support circles (3).

2. A solar trough field system (A) according to the claim 1, wherein it further comprises freely rotatable wheels (7, 7') on the side support units (5, 5') where they contact with the circles (3).

3. A solar trough field system (A) according to the claim 1, wherein said wheel (7, 7') groups located on the side support units (5, 5') where they contact with the circles (3) are the parts of the mechanisms which move the circles (3).

4. A solar trough field system (A) according to the claim 1, wherein a protective lid (8) is used thereon in order to protect the side support units (5, 5') and the wheels (7, 7') from the external effects.

5. A solar trough field system (A) according to the claim 1, wherein in order to increase their strength against the wind loads and have a lesser energy consuming structure, the lower lids (10) for supporting the reflectors (1) which are located in the lower parts of the parabolic reflectors (1), and the lightweight filling material (6) which fills the space between the lower lids and the reflectors (1) are used.

6. A solar trough field system (A) according to the claim 5, wherein the lower lids (10) are in the circular cross section.

7. A solar trough field system (A) according to the claim 5, wherein the support profiles (9) are used for the connection of every support circle (3) to each other and to the integrated structure composed of the reflector (1), the lower lid (10) and the lightweight filling material (6).

8. A solar trough field system (A) according to the claim 1, wherein said core mechanism (2) further comprises an inner circle (12) to which one end of the guy wires is connected while the other end thereof is connected to the support circles (3), a ball or cylindrical roller bearing (13) which is located in the center of the inner circle (12), a housing (14) into which the inner ring of the bearing (13) is placed and a thermal receiver tube (11) which is located in a fixed position in this housing.

9. A solar trough field system (A) according to the claim 1, wherein said parabolic reflectors (1) are used as longitudinal multi-piece instead of single-piece in order to prevent all of them to be damaged in case they are broken due to the external effects, and allow the broken reflectors to be changed easily.

10. A solar trough field system (A) according to the claim 9, wherein the edge widths of those of said multi-piece parabolic reflectors (1) which are close to the center of the parabola are such that they increase towards the side of the parabola.

11. A solar trough field system (A) according to the claim 9, wherein the surfaces of said multi-piece parabolic reflectors facing towards the thermal receiver tubes are made planar and these reflectors are placed on the concave surfaces of a parabolic solar trough such that they reflect the light coming onto their plane surfaces to the thermal receiver tube.

12. A solar trough field system (A) according to the claim 9, wherein the surfaces of said multi-piece parabolic reflectors facing towards the thermal receiver tubes are each in the form of a parabolic cross section and when said parabolic cross sectioned reflectors are positioned one after the other on the concave surface of a parabolic solar trough again, they produce a multi-piece parabolic reflector system, where the focal point of each is the thermal receiver tube.

13. A solar trough field system (A) according to the claim 1, wherein it further comprises a hyperbolic collector (18) which is used around the thermal receiver tube in order to concentrate the beams coming angularly as well as the parallel beams coming from the parabolic reflectors.

14. A solar trough field system (A) according to the claim 13, wherein in order to ensure the more efficient operation of the solar trough field system (A) by reflecting the beams, coming parallel and angularly from the parabolic reflector, from the inner surface of the hyperbolic collector (18) and concentrating them on the thermal receiver tube (11") with high heat conductivity which does not include a glass tube in its outer part, the bottom side of said hyperbolic collector (18) is circular cross sectioned such that it somewhat surrounds the thermal receiver tube (11") and then its arms extending towards two sides are in the hyperbolic form.

15. A solar trough field system (A) according to the claim 13, wherein in order to ensure the more efficient operation of the solar trough field system (A) for the efficiency increase by reflecting the beams from the inner surface of the hyperbolic collector (18) and concentrating them on a thermal receiver tube (11'), the bottom side of said hyperbolic collector (18) is circular cross sectioned such that it somewhat surrounds the thermal receiver tube (11') and then its arms extending towards two sides are in the hyperbolic form, and in order to heat the fluid more quickly which passes through the thermal receiver tube (11') made of glass, the heat fins (19) with high heat conductivity are used inside.

16. A solar trough field system (A) according to the claim 15, wherein said heat fins (19) are in the form of a bar.

17. A solar trough field system (A) according to the claim 15, wherein said heat fins (19) are in the form of a plate.

18. A solar trough field system (A) according to one of the claims 14-15, wherein there is a second glass tube on the outer parts of the thermal receiver tubes (11", 11') such that a vacuum space is therebetween.

* * * * *